3,159,653
HYDROFORMYLATION OF DIHYDROPYRANS
Jürgen F. Falbe, Bonn, and Friedrich W. A. G. K. Korte, Hangelar, Germany, assignors to Shell Oil Company, New York, N.Y., a corporation of Delaware
No Drawing. Filed Oct. 9, 1962, Ser. No. 229,468
7 Claims. (Cl. 260—345.9)

This invention relates to a new type of hydroformylation reaction in which dihydropyrans having a vinyl ether group in the molecule are reacted with carbon monoxide and hydrogen. It deals with a novel method of producing valuable oxygenated tetrahydropyrans in this way.

Hydroformylation, sometimes called "oxo" reaction, is a well known method for synthesizing carbonyl compounds, mainly aldehydes, from olefins by reaction with carbon monoxide and hydrogen in the presence of a hydrogenation catalyst, usually containing a Group VIII metal, especially cobalt in combined form. The aldehyde products initially formed are often converted in a separate step to the corresponding alcohols which can also be produced by a single step method of operation. Similar reaction of certain other olefinic compounds such as esters of unsaturated acids and the like has also been suggested. But dihydropyrans have heretofore not been considered suitable starting materials for hydroformylation since there seems to be no mention of this reaction in the literature. It was therefore surprising to find that one special type of dihydropyran, namely that having the double bond in vinyl position with respect to the ring oxygen atom can be successfully reacted with carbon monoxide and hydrogen in the presence of hydroformylation catalysts to produce hydroformylation products in good yield.

The new reaction can be carried out with all types of 3,4-dihydro-2H-pyran compounds, that is dihydropyrans which contain in the ring an ether oxygen atom which is directly linked to a carbon atom which is joined by an ethylenic double bond to another carbon atom of the ring, the other three linkages of said ethylenic group being attached to hydrogen or carbon atoms. Preferred starting materials for the process of the invention can be represented by the following formula:

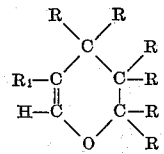

wherein $R_1$ is a member of the group: hydrogen, hydrocarbon or substituted hydrocarbon of 1 to 18 carbon atoms in which the substituents are halogen atoms such as fluorine, chlorine and bromine, or hydroxyl, ether, carboxylic acid or carboxylic acid ester groups. The other R's can be chosen from the same group or can be said substituents attached directly to the ring. Two or more R's can together represent a polyvalent radical such that the cyclic vinyl ether contains a plurality of rings, each preferably having 5 or 6 atoms in each ring. Especially preferred starting compounds are the monocyclic dihydropyrans, most preferably those which contain no other multiple bonds between carbon atoms than those in the dihydropyran ring or rings in the molecule. Dihydropyran compounds having 5 to 24 carbon atoms in the molecule are a preferred subgroup of starting materials for the new hydroformylation process.

Especially advantageous starting materials of the foregoing type are the dihydropyran compounds of the proceeding formula in which one R linked to the carbon directly joined to the ether oxygen is hydrogen, hydrocarbon or hydrocarbon substituted by one or more of the previously indicated substituent groups or atoms. Another particularly suitable group of starting compounds are those of the formula

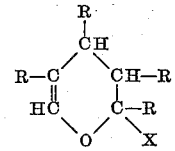

wherein each R represents hydrogen or a lower alkyl group, preferably methyl, and X represents hydrogen, lower alkyl, hydroxy lower alkyl, ether, particularly alkoxy, acyloxyalkyl, carboxyl or carboxyalkyl. Representative of these compounds are, 3,4-dihydro-2H-pyran and its alkyl substitution products of which 4-ethyl-3,4-dihydro-2H-pyran; 3,4-dimethyl-3,4-dihydro-2H-pyran; 2-hydro-2H-pyran; 3,4-dimethyl-3,4-dihydro-2H-pyran; 2-octyl-3,4-dihydro-2H-pyran and 2,5-dimethyl-2-phenyl-3,4-dihydro-2H-pyran are examples. 2-hydroxymethyl-3,4-dihydro-2H-pyran; 2,2-bis(hydroxymethyl)-3,4-dihydro-2H-pyran and 2,5-dimethyl-2-hydroxymethyl-3,4-dihydro-2H-pyran are typical examples of useful hydroxyalkyl-substituted dihydropyrans. U.S. Patent 2,514,168 describes numerous ether-substituted dihydropyrans which can be hydroformylated according to the invention, for instance 2-isobutoxy-3,4-dihydro-2H-pyran; 2-methoxy-5-methyl-3,4-dihydro-2H-pyran; 2-octadecyloxy-3,4-dihydro-2H-pyran; 2-tolyloxy-3,4-dihydro-2H-pyran, and the like. The same patent and Whetstone Patents U.S. 2,479,283 and U.S. 2,514,172 disclose carboxyl- and ester-substituted dihydropyrans which can be similarly reacted in the new process, e.g. 2,5-dimethyl-3,4-dihydro-2H-pyran-2-carboxylic acid, and its methyl ester, 3,4-dihydro-2H-pyran-carboxylic and ethyl ester; 2-acetoxy-3,4-dihydropyran, etc.

The foregoing patents also describe 3,4-dihydro-2H-pyran compounds which have other ethylenic double bonds in the molecule. These are also amenable to the process of the invention and are useful in the preparation of products of multiple hydroformylation in the same molecule. Thus, for example, use of the 2-(3,4-dihydro-2H-pyran) alkenyl ethers such as 2-allyloxy-3,4-dihydro-2H-pyran; bis-2-(3,4-dihydro-2H-pyranyl) ether and the like disclosed in U.S. Patent 2,514,168 will usually result in hydroformylation of the alkenyl group simultaneously with the hydroformylation of the dihydropyran ring. This is also the case with the unsaturated esters of U.S. Patent 2,514,172 such as the allyl ester of 3,4-dihydro-2H-pyran-2-carboxylic acid, etc. and with 2,5-dimethyl-3,4-dihydro-2H-pyran-2-methyl 2,5-dimethyl-3,4-dihydro-2H-pyran-2-carboxylate.

Compounds with a plurality of 3,4-dihydro-2H-pyran rings each of which undergoes hydroformylation in the process of the invention represents another special subgroup of useful starting compounds.

The hydroformylation is preferably carried out with the 3,4-dihydro-2H-pyran compound in the liquid phase. Advantageously a solution of the dihydropyran compound in an inert solvent is used. The solvent which will be most useful will depend upon the particular dihydropyran compound which is being hydroformylated. Hydrocarbon solvents of which benzene, toluene and cyclohexane are examples, is one type of useful solvent.

Catalysts useful for oxo reaction or hydroformylation of olefins can generally be employed in the process of the invention. Those containing one or more carbonyl-forming metals of Group VIII of the Periodic Table, are particularly useful for the reaction. Iron, cobalt, nickel and rhodium-containing catalysts, for example, can be used. These can be applied as the metals or more advantageously as their compounds, particularly the carbonyls. Dicobalt octacarbonyl and/or cobalt hydrocarbonyl are especially useful. These catalysts can be used alone or with any of the many promoters and modifiers which have been described as suitable with carbonylation catalysts in the hydroformylation of olefins. Illustrative examples of these can be found in U.S. 2,811,-567, U.S. 2,839,812, U.S. 3,003,938, Canadian 646,399 and Canadian 646,448 for instance. Belgium Patent No. 606,408 describes a particularly useful modification in which a complex between a transition metal of atomic number from 23 to 85 and a biphyllic ligand containing a trivalent atom of Group VA having an atomic number from 15 to 51 is employed as catalyst favoring production of higher proportions of alcohols to aldehydes in the first stage of olefin hydroformylation and permitting the use of pressures as low as one atmosphere for the reaction. The procedures of these disclosures are hereby incorporated by references in the present description as usable in the 3,4-dihydro-2H-pyran hydroformylation process of the invention.

The amount of catalyst used is not critical. Amounts of the order of about 1 to about 10%, more preferably about 4 to 6%, by weight of metal based on the 3,4-dihydro-2H-pyran compound being hydroformylated are generally suitable.

The temperature of hydroformylation can be varied rather widely. Temperatures of about 100° to about 300° C. are useful, but usually a temperature in the range of about 150° to about 200° C. is preferable. Pressures varying from about 40 to about 600 atmospheres, particularly from about 150 to about 300 atmospheres have been found to be suitable with cobalt carbonyl and similar catalysts, but higher or lower pressures are also operative depending on the catalyst chosen. Under these conditions satisfactory hydroformylation can usually be carried out in about one to about ten hours.

The reaction gas employed preferably contains at least one molecule of hydrogen per mole of carbon monoxide in the mixture, but higher or lower ratios can be used. A molar excess of hydrogen to carbon monoxide up to a mole ratio of about 2:1 is sometimes advantageous. At least one mole of carbon monoxide per ethylene double bond to be hydroformylated in the starting dihydropyran should be used and generally an excess of carbon monoxide thereover is more advantageous. Thus for starting dihydropyrans having a hydroformylatable ethylenic double bond in addition to the vinyl ether linkage of the ring one can advantageously use at least two moles of carbon monoxide per mole of ether in the feed.

The hydroformylation can be carried out batchwise, continuously or intermittently, using any suitable method for contacting the vinyl ether simultaneously with carbon monoxide, hydrogen and a hydroformylation catalyst under hydroformylation conditions.

The following examples illustrate in more detail, a suitable procedure for carrying out the new process.

EXAMPLE I

2,6-Dimethyloltetrahydropyran Production

A 2-litre refined steel autoclave equipped with a magnetically operated double-acting agitator was charged with 210 grams of 3,4-dihydro-2H-pyran-2-methylol which had been prepared by catalytic hydrogenation of acrolein dimer, 250 ml. of a benzene solution of dicobalt octacarbonyl [$Co_2(CO)_8$] and 250 ml. of benzene. Carbon monoxide and hydrogen in 1:1 mole ratio was then introduced until the pressure in the autoclave was of 190 atmospheres and the autoclave was heated to 185° C. After the required temperature had been reached, the gas mixture was again introduced until the final pressure was 300 atmospheres and stirring was continued for 2½ hours. The autoclave was subsequently cooled, the excess gas vented, the catalyst decomposition products removed by suction, the solvent distilled off in vacuo and the crude product removed by distillation with a Vigreux column. There was recovered 171.5 g. of 2,6-dimethylol tetrahydropyran corresponding to 64% of theory.

Boiling point (0.2 mm.): 120–128° C.
Refractive index $n_{20}^D$: 1.4800
IR ether bonds: 1095 cm.$^{-1}$
Analysis—
  Calculated: C=57.51; H=9.65
  Found: C=57.09; H=9.65

The substitution in the 6-position was established by nuclear resonance spectroscopy.

EXAMPLE II

When the method of Example I is carried out in the same way using 2,5-dimethyl-3,4-dihydro-2H-pyran-2-methylol prepared by hydrogenation of methacrolein dimer in place of 3,4-dihydro-2H-pyran-2-methylol, a similar production of 2,5-dimethyl-2,6-dimethylol tetrahydropyran can be obtained.

EXAMPLE III

Using the procedure of Example I the following dihydropyran compounds can be hydroformylated to obtain the indicated products:

| Starting Materials | Hydroformylation Products |
| --- | --- |
| 2,2-bis(hydroxymethyl)-3,4-dihydro-2H-pyran. | 2,2,6-trimethyloltetrahydropyran. |
| 2-ethoxy-3-ethyl-3,4-dihydro-2H-pyran. | 2-ethoxy-3-ethyl-6-methyloltetrahydropyran. |
| 3-methyl-3,4-dihydro-2H-pyran. | 3-methyl-6-methyloltetrahydropyran. |
| 2-(3,4-dihydro-2H-pyranyl) phenyl ether. | 2-(6-methyloltetrahydropyranyl) phenyl ether. |
| Bis-2-(3,4-dihydro-2H-pyranyl) ether. | Bis-2-(6-methyloltetrahydropyranyl) ether. |
| 2-carbethoxy-3,4-dihydro-2H-pyran. | 2-carbethoxy-6-methyloltetrahydropyran. |
| 2-acetoxy-3,4-dihydro-2H-pyran. | 2-acetoxy-6-methyloltetrahydropyran. |
| 3,4-dihydro-2H-pyran-2-methyl 3,4-dihydro-2H-pyran-2-carboxylate. | 6-methyloltetrahydropyran-2-methyl 6-methyloltetrahydropyran-2-carboxylate. |
| 3,4-dihydro-2H-pyran-2-carboxaldehyde glycerol cyclic acetal. | 6-methyloltetrahydropyran-2-carboxaldehyde glycerol cyclic acetal. |
| 2-(2,4-dimethyl-3,4-dihydro-2H-pyranyl) isopropyl ether. | 2-(2,4-dimethyl-6-methyloltetrahydropyranyl) isopropyl ether. |

Not only is the high yield obtainable in these hydroformylations contrary to expectation in view of the low yields usually found previously in hydroformylating double bonds between secondary carbon atoms, but also it could not have been anticipitated that only one compound would be formed with the added methylol in the 6-position on the ring or rings.

Single stage reaction to introduce a methylol group at the vinylic double bond of the dihydropyran has been emphasized in the foregoing because of the special value of the methylol-substituted tetrahydropyrans which are obtained in this way. However, the reaction can also be carried out to obtain the corresponding aldehyde-substituted tetrahydropyrans which can be recovered by conventional methods and either separately hydrogenated or used for other purposes.

These aldehyde-substituted tetrahydropyrans are useful starting materials for oxidation to tetrahydropyran carboxylic acids, which can be esterified to obtain plasticizers, synthetic lubricants and the like. The polycarboxylic acids obtainable in this way are particularly useful for making polyesters.

The methylol-substituted tetrahydropyran compounds obtained as primary products of the new hydroformylation process or by hydrogenation of the aldehydic products described above are especially valuable compounds with many useful applications. The liquid methylol-substituted tetrahydropyran compounds have advantageous solvent properties which make them suitable for formulating paint and lacquer vehicles. They are also useful as intermediates for the production of esters which also have solvent properties and can be used as plasticizers in resins and other polymer products. Those with a plurality of hydroxyl groups are especially suitable for the synthesis of polyesters, particularly polyesters of polycarboxylic acids such, for example, as maleic and the phthalic acids. Polyesters of this kind can be made with advantageous properties for use in surface coating compositions. The 2,6-dimethylol tetrahydropyran of Example I, for instance, is especially useful as a cheap and advantageous solvent and as starting material for polyesters.

We claim as our invention:

1. A method of preparing 6-methanol tetrahydropyrans by hydroformylation 3,4-dihydro-2H-pyrans having from 5 to 24 carbon atoms in the molecule by contacting such a dihydropyran with carbon monoxide and hydrogen at a pressure between 150 atmospheres and 300 atmospheres at a temperature between 100° C. and 300° C. in the presence of a hydroformylation catalyst.

2. A method according to claim 1 wherein the hydroformylation catalyst is dicobalt octacarbonyl.

3. A method of preparing 6-methanol tetrahydropyrans by hydroformylation of 3,4-dihydro-2H-pyrans having from 5 to 24 carbon atoms in the molecule and represented by the structure

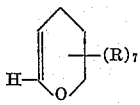

wherein each of the R's represents a number of the group consisting of hydrogen, alkyl from 1–18 carbon atoms, halogen substituted alkyl from 1–18 carbon atoms, hydroxyl substituted alkyl from 1–18 carbon atoms, ether, carboxylic acid, carboxylic acid ester and alkoxy by contacting such a dihydropyran with carbon monoxide and hydrogen at a pressure between 150 atmospheres and 300 atmospheres and at a temperature between 100° C. and 300° C. in the presence of from 1% to 10% by weight of said dihydropyran of dicobalt octacarbonyl as catalyst.

4. A method according to claim 1 in which the dihydropyran having from 5 to 24 carbon atoms are polycyclic pyrans selected from the group consisting of

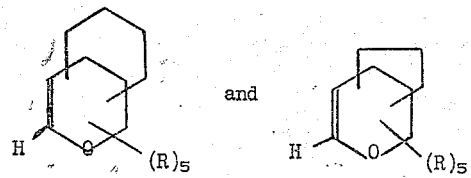

wherein each of the R's are selected from the group consisting of hydrogen, alkyl, halogen substituted alkyl, hydroxyl substituted alkyl, alkoxy, ether, carboxylic acid and carboxylic acid ester.

5. A method according to claim 1 in which the dihydropyran hydroformylated is 3,4-dihydro-2H-pyran-2-methanol.

6. A method according to claim 1 in which the dihydropyran hydroformylated is 2,5-dimethyl-3,4-dihydro-2H-pyran-2-methanol.

7. A method according to claim 1 in which the dihydropyran hydroformylated is 2,2-dimethyl-3,4-dihydro-2H-pyran.

No references cited.